(12) United States Patent
Son et al.

(10) Patent No.: US 7,941,169 B2
(45) Date of Patent: May 10, 2011

(54) AUTOMATIC NETWORK CONFIGURATION APPARATUS AND METHOD BETWEEN SHORT-RANGE WIRELESS TERMINALS

(75) Inventors: Ji-Yeon Son, Daejon (KR); Jun-Seok Park, Daejon (KR); Il-Sik Yang, Daejon (KR); Myunggyu Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 823 days.

(21) Appl. No.: 11/951,420

(22) Filed: Dec. 6, 2007

(65) Prior Publication Data

US 2008/0139125 A1 Jun. 12, 2008

(30) Foreign Application Priority Data

Dec. 8, 2006 (KR) .................. 10-2006-0125123

(51) Int. Cl.
*H04B 15/00* (2006.01)
(52) U.S. Cl. .......... 455/504; 455/10; 455/505; 455/506; 342/125; 340/10.1
(58) Field of Classification Search ............ 455/504, 455/10, 505, 506, 63.1, 67.11, 67.16, 115.1, 455/115.2, 115.3, 41.2, 421; 342/125, 90; 340/10.1
See application file for complete search history.

(56) References Cited

U.S. PATENT DOCUMENTS

| | | | | |
|---|---|---|---|---|
| 5,650,769 A | * | 7/1997 | Campana, Jr. | 340/573.4 |
| 5,790,944 A | * | 8/1998 | Karki et al. | 455/226.2 |
| 6,002,672 A | * | 12/1999 | Todd | 370/252 |
| 6,118,773 A | * | 9/2000 | Todd | 370/334 |
| 6,233,454 B1 | * | 5/2001 | Sato | 455/437 |
| 6,418,304 B1 | * | 7/2002 | Morrar | 455/343.1 |
| 6,819,927 B1 | * | 11/2004 | Sato | 455/437 |
| 7,298,314 B2 | * | 11/2007 | Schantz et al. | 342/125 |
| 7,592,949 B2 | * | 9/2009 | Schantz et al. | 342/174 |
| 7,602,275 B2 | * | 10/2009 | Dishongh et al. | 340/309.16 |
| 2003/0179813 A1 | * | 9/2003 | Morita et al. | 375/148 |
| 2003/0228857 A1 | * | 12/2003 | Maeki | 455/278.1 |
| 2008/0091345 A1 | * | 4/2008 | Patel et al. | 701/208 |
| 2008/0165050 A1 | * | 7/2008 | Schantz et al. | 342/165 |
| 2009/0067392 A1 | * | 3/2009 | Hart et al. | 370/338 |
| 2010/0103025 A1 | * | 4/2010 | Schantz et al. | 342/174 |
| 2010/0109842 A1 | * | 5/2010 | Patel et al. | 340/10.1 |
| 2010/0113099 A1 | * | 5/2010 | Uno et al. | 455/562.1 |
| 2010/0238862 A1 | * | 9/2010 | Davidson et al. | 370/328 |

(Continued)

FOREIGN PATENT DOCUMENTS

JP 2004-364145 12/2004

(Continued)

*Primary Examiner* — Minh D Dao
(74) *Attorney, Agent, or Firm* — Ladas & Parry LLP

(57) ABSTRACT

Provided are an automatic network configuration apparatus and method between short-range wireless terminals. The apparatus includes a storing unit for storing a threshold range value for determining adjacency with an adjacent wireless terminal, a wireless environment compensation constant in a present wireless environment, and a network configuration parameter for automatic network configuration; a signal strength measuring unit for periodically measuring strength of the wireless signal transmitted from the adjacent wireless terminal; a range calculating unit for calculating a range from another wireless terminal corresponding to the strength of the wireless signal measured in the signal strength measuring unit based on the wireless environment compensation constant in the pre-stored present wireless environment; and a network configuring unit for performing network configuration with the adjacent wireless terminal when the calculated range is within a threshold for determining adjacency.

5 Claims, 2 Drawing Sheets

U.S. PATENT DOCUMENTS

2010/0246496 A1* 9/2010 Yurugi et al. .................. 370/328
2010/0246725 A1* 9/2010 Okuyama et al. ............. 375/340

FOREIGN PATENT DOCUMENTS

| | | |
|---|---|---|
| KR | 2001-0070917 A | 7/2001 |
| KR | 1020020076195 | 10/2002 |
| KR | 2006-0003756 A | 1/2006 |
| KR | 2006-0062413 A | 6/2006 |
| KR | 1020060105019 | 10/2006 |

* cited by examiner

AUTOMATIC NETWORK CONFIGURATION APPARATUS AND METHOD BETWEEN SHORT-RANGE WIRELESS TERMINALS

CROSS-REFERENCE TO RELATED APPLICATIONS

The present invention claims priority of Korean Patent Application No. 10-2006-0125123, filed on Dec. 8, 2006, which is incorporated herein by reference.

BACKGROUND OF THE INVENTION

1. Field of the Invention

The present invention relates to an automatic network configuration apparatus and method between short-range wireless terminals; and, more particularly, to an automatic network configuration apparatus between short-range wireless terminals by measuring adjacency based on signal strength between wireless terminals according to a short-range wireless communication method, and a method thereof.

This work was supported by the IT R&D program for MIC/IITA [2006-S-031-01, "Five Senses Information Processing Technology Development for Network Based Reality Service"].

2. Description of Related Art

Recently, interests on a short-range wireless communication technology with a mobile increase. For example, the short-range wireless communication technology includes wireless Local Area Network (LAN), Bluetooth, Zigbee, Ultra Wide Band (UWB), and near field communication (NFC). The terminals where the wireless communication technology is applied are formed to be easily portable. Accordingly, it is frequently required that the wireless terminals should exchange diverse information and contents with other wireless terminals while moving to different places. However, when the user moves with the wireless terminal, the user manually configures the wireless network to perform wireless data communication with another terminal.

A conventional network configuration technology for solving the inactive network access has a plurality of wireless communication modules of different methods within the wireless terminal, exchanges information for network access of second wireless communication having a complicated procedure based on a first wireless communication method having a comparatively simple configuration procedure, and automates network configuration by the second wireless communication method. For example, there is a network automatic access method of Bluetooth and wireless LAN using a near field communication (NFC) technology. The short-range wireless communication technology is a non-contact ultra short-range wireless communication technology where data communication is performed when a terminal accesses to a range within 10 cm.

However, the conventional network configuration technology should load an additional wireless communication module such as short-range wireless communication. Also, there is a problem that the conventional network configuration technology cannot perform network configuration with a single wireless communication method.

SUMMARY OF THE INVENTION

An embodiment of the present invention is directed to providing an automatic network configuration apparatus between short-range wireless terminals by measuring adjacency based on signal strength between wireless terminals according to a short-range wireless communication method, and a method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an automatic network configuration apparatus between short-range wireless terminals, including: a storing unit for storing a threshold range value for determining adjacency with an adjacent wireless terminal, a wireless environment compensation constant in a present wireless environment, and a network configuration parameter for automatic network configuration; a signal strength measuring unit for periodically measuring strength of the wireless signal transmitted from the adjacent wireless terminal; a range calculating unit for calculating a range from another wireless terminal corresponding to the strength of the wireless signal measured in the signal strength measuring unit based on the wireless environment compensation constant in the pre-stored present wireless environment; and a network configuring unit for performing network configuration with the adjacent wireless terminal when the calculated range is within a threshold for determining adjacency.

In accordance with another aspect of the present invention, there is provided an automatic network configuration method between short-range wireless terminals, including the steps of: periodically measuring strength of a wireless signal transmitted from an adjacent wireless terminal; calculating a range from another wireless terminal corresponding to the measured strength of the wireless signal based on a wireless environment compensation constant in a pre-stored present wireless environment; and performing network configuration with another wireless terminal when the calculated range is within a threshold.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
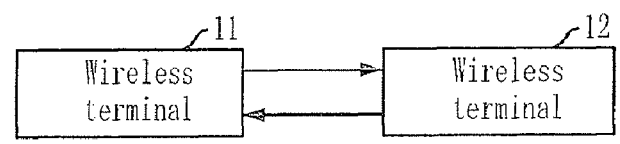
FIG. 1 shows a network configuration between adjacent wireless terminals where the present invention is applied.

FIG. 1 shows a network configuration between adjacent wireless terminals where the present invention is applied.

Referring to FIG. 1, when a wireless terminal 11 is within a threshold range from a counterpart wireless terminal 12, network configuration is performed according to a short-range wireless communication method. The wireless terminals 11 and 12 adopt the same short-range wireless communication method. For example, the wireless communication method includes a wireless Local Area Network (LAN), Bluetooth, and Zigbee. The wireless terminal 11 or the wireless terminal 12 may be a mobile terminal or a fixed terminal.

Figure 2:
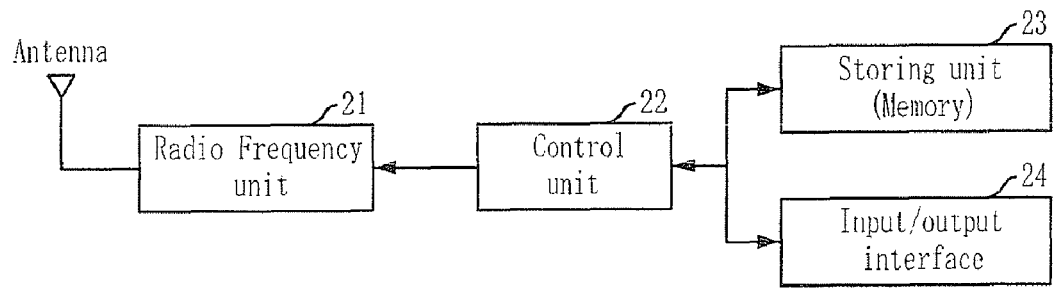
FIG. 2 illustrates the wireless terminal of FIG. 1.

FIG. 2 illustrates the wireless terminal of FIG. 1.

Referring to FIG. 2, the wireless terminal 11 or the wireless terminal 12 includes a Radio Frequency unit 21, a control unit 22, a storing unit 23, and an input/output interface 24.

Constituent elements of the automatic network configuration apparatus according to the present invention will be described on the basis of wireless terminal 11.

The RF unit 21 periodically monitors strength of a wireless signal transmitted from an adjacent wireless terminal. That is, the RF unit 21 receives a wireless signal from adjacent wireless terminals including the wireless terminal 12, and periodically measures the strength of the received wireless signal. The RF unit 21 transmits a measurement result on the strength of the received signal to the control unit 22.

The control unit 22 calculates a range corresponding to the strength of the signal transmitted from the RF unit 21 based on a compensation constant on signal strength or range in a present wireless environment, which is called a wireless environment compensation constant. When the calculated range is within a threshold range, the control unit 22 controls the RF unit 21 for automatic network connection. The control unit 22 receives a measurement result on the strength of the signal transmitted from the RF unit 21. The control unit 22 calculates a range on the compensated signal strength by applying a compensation constant on the signal strength or range in the present wireless environment, which is called a wireless environment compensation constant, to the transmitted measurement result. When the range on the signal strength from the wireless terminal 12 is within the threshold, the control unit 22 automatically configures network connection with the wireless terminal 12.

The storing unit 23 stores the threshold on the signal strength or range for determining adjacency with the wireless terminal 12, a compensation constant on the present wireless environment, and a network configuration parameter for network automatic configuration in the control unit 22.

The input/output interface 24 supports an input/output function with a user. That is, the input/output interface 24 supports compensation on the present wireless environment from the user, or notifies completion of the network configuration to the user when the automatic network configuration with the adjacent wireless terminal 12 within a predetermined range is completed.

Figure 3:
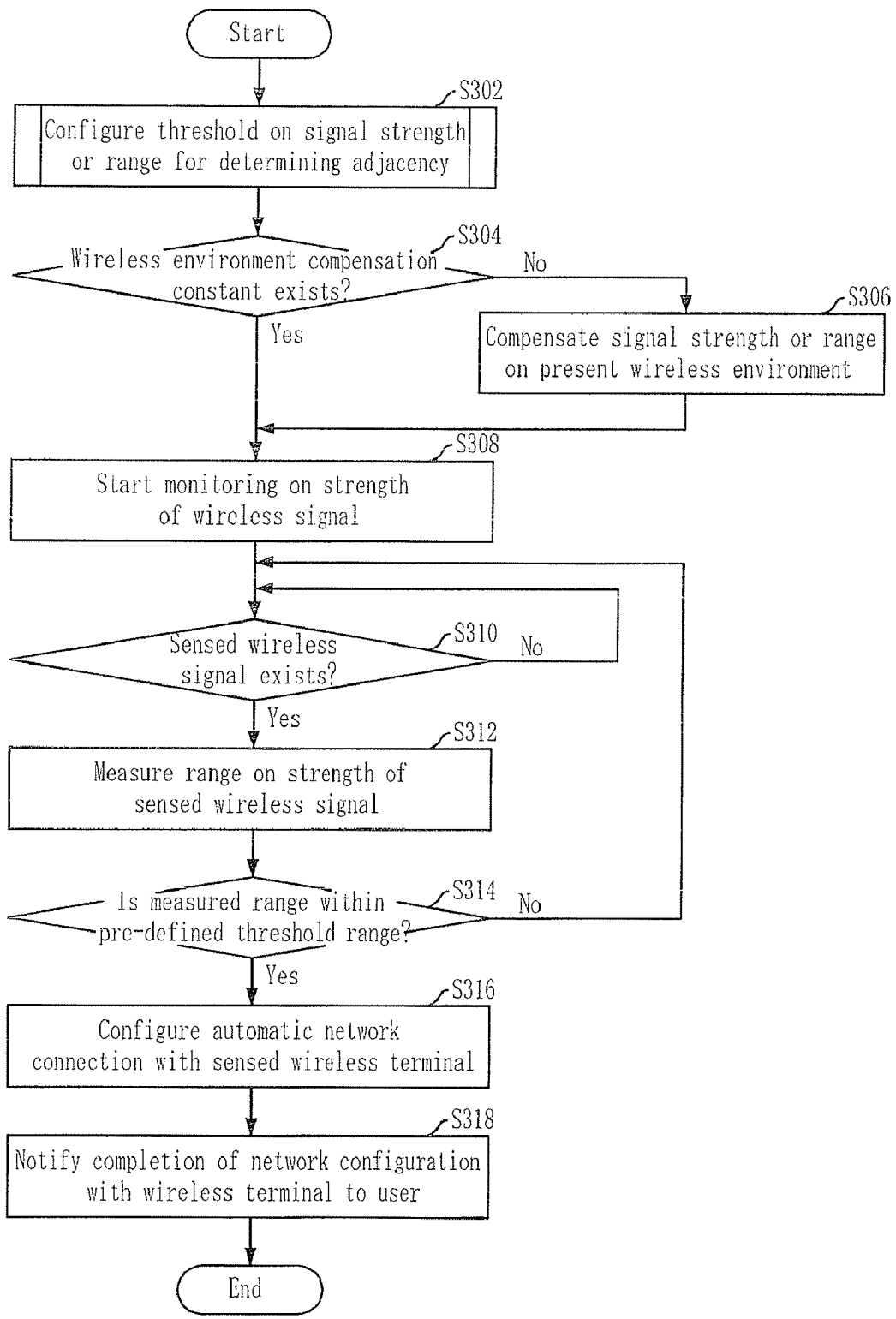
FIG. 3 is a flowchart describing an automatic network configuration method between short-range wireless terminals in accordance with an embodiment of the present invention.

FIG. 3 is a flowchart describing an automatic network configuration method between short-range wireless terminals in accordance with an embodiment of the present invention.

The control unit 22 of the wireless terminal 12 stores the threshold on the signal strength or range for determining adjacency, network configuration parameters for automatic network configuration, e.g., network identification (ID), a network security key, a channel number, and a network mode, in the storing unit 23 in advance at step S302. The threshold for determining adjacency may be configured according to a characteristic of the short-range wireless communication module by the user. The control unit 22 checks at step S304 whether the storing unit 23 includes the wireless environment compensation constant.

At the check result of step S304, when the wireless environment compensation constant does not exist, the RF unit 21 requests the configuration of the wireless environment compensation constant to the user through the input/output interface 24. The control unit 22 receives the wireless environment compensation constant from the user the through the input/output interface 24 and uses the wireless environment compensation constant in measuring of the range on the signal strength. The control unit 22 stores the newly inputted wireless environment compensation constant in the storing unit 23.

For example, to have a look at a wireless environment compensation constant configuration procedure, the control unit 22 measures strength of the wireless signal transmitted between the wireless terminals 11 and 12 within a predetermined standard range, e.g., 10 cm or 1 m, upon request of the user, and checks whether the signal strength corresponding to the standard range is proper. Accordingly, the control unit 22 can calculate the wireless environment compensation constant for range compensation.

At the check result of step S304, when the wireless environment compensation constant exists, i.e., when the wireless environment compensation constant is stored in the storing unit 23, a procedure of step S306 is not performed, but a procedure of step S308 is performed. For example, a wireless environment compensation constant in an open space or an indoor space crowded with people can be configured in advance.

The RF unit 21 starts monitoring on the strength of the wireless signal from the wireless terminal 12 at step S308. The RF unit 21 periodically checks at step S310 whether there is a sensed wireless signal.

At the check result of step S310, when the periodically sensed wireless signal exists, the control unit 22 measures the range on the strength of the sensed wireless signal through the monitoring result transmitted from the RF unit 21 at step S312. The control unit 22 can measure the range on the wireless signal by applying any one of the wireless environment compensation constant pre-stored in the storing unit 23 or the wireless environment compensation constants obtained in the procedure of step S306.

At the check result of step S310, when the periodically sensed wireless signal does not exist, a logic flow repeatedly goes to a procedure of step S310.

The control unit 22 checks at step S314 whether the range on the strength of the wireless signal measured in the procedure of step S312 is within pre-defined threshold range. That is, the procedure of step S314 is for checking whether the range between the wireless terminals 12 and 11 is within the threshold range.

The RF unit 21 automatically configures network connection with the adjacent wireless terminal 12 within the threshold range based on the network configuration parameter stored in the storing unit 23 according to control of the control unit 22 at step S316. The network configuration parameter includes a network ID, a network security key, a channel number, and a network mode.

When the network connection configuration is completed at step S316, the control unit 22 notifies the completion of the network configuration to the user through the input/output interface 24 at step S318.

The present invention can automatize network connection configuration only by accessing to another wireless terminal to a predetermined range in any place by measuring adjacency based on signal strength between terminals using a short-range wireless method, and automatically performing network connection between adjacent wireless terminals within a predetermined range.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. An automatic network configuration apparatus between short-range wireless terminals, comprising:
   a storing means for storing a threshold range value for determining adjacency with an adjacent wireless terminal, a wireless environment compensation constant in a present wireless environment, and a network configuration parameter for automatic network configuration;
   a signal strength measuring means for periodically measuring strength of the wireless signal transmitted from the adjacent wireless terminal;
   a range calculating means for calculating a range from another wireless terminal corresponding to the strength of the wireless signal measured in the signal strength measuring means based on the wireless environment compensation constant in the pre-stored present wireless environment; and
   a network configuring means for performing network configuration with the adjacent wireless terminal when the calculated range is within a threshold for determining adjacency.

2. The apparatus of claim 1, further comprising:
   a user interface for providing an automatic network configuration result to the user when the wireless environment compensation constant does not exist in the storing means, or when a new wireless environment compensation constant is transmitted from the user in order to update the stored wireless environment compensation constant and the automatic network configuration with another wireless terminal is completed.

3. An automatic network configuration method between short-range wireless terminals, comprising the steps of:
   periodically measuring strength of a wireless signal transmitted from an adjacent wireless terminal;
   calculating a range from another wireless terminal corresponding to the measured strength of the wireless signal based on a wireless environment compensation constant in a pre-stored present wireless environment; and
   performing network configuration with another wireless terminal when the calculated range is within a threshold.

4. The method of claim 3, further comprising the step of:
   receiving a new wireless environment compensation constant from a user when the wireless environment compensation constant does not exist, or when the pre-stored wireless environment compensation constant needs to be updated.

5. The method of claim 4, further comprising the step of:
   notifying an automatic network configuration result to the user when the automatic network configuration with another wireless terminal is completed.

* * * * *